United States Patent [19]

Yokogawa

[11] Patent Number: 5,124,808
[45] Date of Patent: Jun. 23, 1992

[54] SPINDLE CONTROL DEVICE IN OPTICAL DISK RECORDING/REPRODUCING APPARATUS

[75] Inventor: Fumihiko Yokogawa, Saitama, Japan

[73] Assignee: Pioneer Electronic Corporation, Tokyo, Japan

[21] Appl. No.: 511,152

[22] Filed: Apr. 19, 1990

[30] Foreign Application Priority Data

Aug. 7, 1989 [JP] Japan .................. 1-204490

[51] Int. Cl.⁵ ........................... H04N 5/95
[52] U.S. Cl. .................... 358/338; 358/342
[58] Field of Search .......... 358/342, 335, 338, 321, 358/320, 322, 323, 324, 337, 339; 369/47, 48, 49, 50; 360/73.01, 73.03

[56] References Cited

U.S. PATENT DOCUMENTS

| 4,223,349 | 9/1980 | Dakin et al. | 369/50 |
|---|---|---|---|
| 4,353,089 | 10/1982 | Winslow et al. | 369/48 |
| 4,390,977 | 6/1983 | Onigata et al. | 358/342 |
| 4,542,423 | 9/1985 | Kotake et al. | 369/50 |
| 4,544,957 | 10/1987 | Moriya et al. | 358/322 |
| 4,672,595 | 6/1987 | Senso | 364/50 |
| 4,694,456 | 9/1987 | Morita et al. | 358/336 |
| 4,819,221 | 4/1989 | Overath et al. | 358/342 |
| 4,841,511 | 6/1989 | Suzuki et al. | 369/50 |
| 4,855,978 | 8/1989 | Kanamaru | 369/50 |
| 4,908,810 | 3/1990 | Oie | 369/30 |

FOREIGN PATENT DOCUMENTS

| 57-150292 | 9/1982 | Japan | 358/320 |
|---|---|---|---|
| 61-180937 | 8/1986 | Japan | 369/48 |
| 63-224068 | 9/1988 | Japan | 369/47 |

*Primary Examiner*—Roy N. Envall, Jr.
*Assistant Examiner*—Thai Tran
*Attorney, Agent, or Firm*—Sughrue, Mion, Zinn Macpeak & Seas

[57] ABSTRACT

A disk recording/reproducing apparatus includes a spindle control device in which phase control is performed when spindle motor speed is within a predetermined range, and a synchronizing mark detection signal is detected normally. For a composite video signal, a signal synchronization signal may be produced in response to detection of a synchronizing signal within that composite video sinal; phase control may be performed in response to that signal synchronization signal as well. In the absence of one or more of these signals for less than a predetermined time, phase control may be performed based on predetermined phase-difference information. Additionally, an error may be generated if one or more of the above-mentioned signals is absent for longer than a predetermined time.

6 Claims, 2 Drawing Sheets

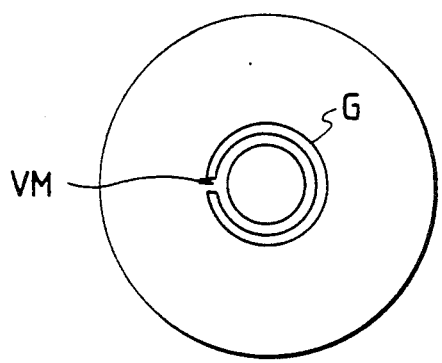
FIG. 1
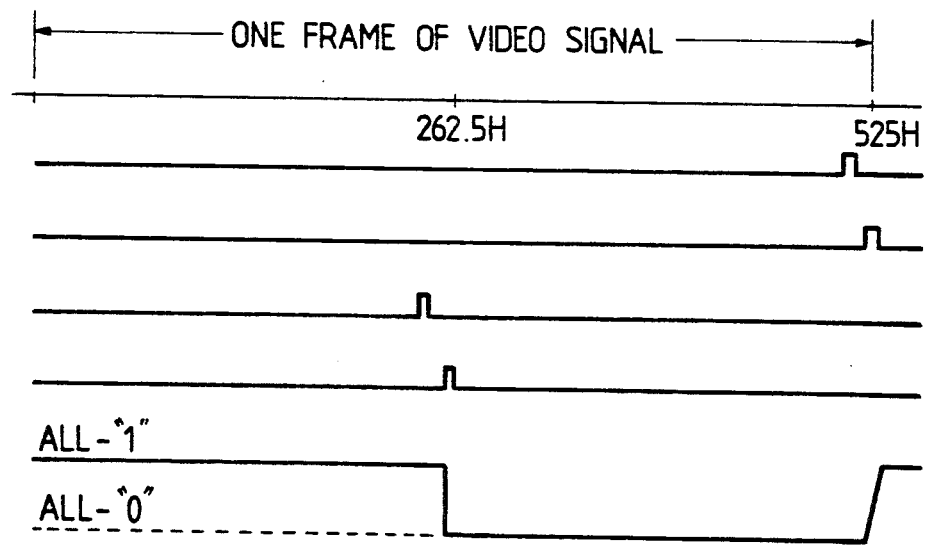

SPINDLE CONTROL DEVICE IN OPTICAL DISK RECORDING/REPRODUCING APPARATUS

BACKGROUND OF THE INVENTION

The present invention relates to a spindle control device, and particularly to a spindle control device in an optical disk recording/reproducing apparatus in which one frame of a composite video signal (including synchronizing signals such as a horizontal synchronizing signal, a vertical synchronizing signal, and the like) is recorded on each track on an optical disk (including an opto-magnetic disk and a phase-change type optical disk) having a vertical synchronizing mark, and in which the recorded signal on the optical disk is reproduced or erased.

In a conventional reproducing-only video disk player, since an optical disk to be played carries a composite video signal already recorded thereon, the composite video signal is read from the optical disk and demodulated. A phase difference of a reproducing horizontal synchronizing signal included in the demodulated composite video signal relative to a reference horizontal synchronizing signal is detected so as to perform spindle servo control in accordance with the detected phase difference.

On the other hand, in a system in which one frame of a composite video signal is recorded on each track on an optical disk and the recorded signal is reproduced or erased, no composite video signal exists on the disk before recording. As a result, spindle servo control cannot be performed by use of a reproducing horizontal synchronizing signal, unlike the above-mentioned reproducing player. Accordingly, a vertical synchronizing mark VM made of a mirror portion where no pregroove G is cut is provided, one for every rotation on a disk, for example, at its inner circumference (or at its outer circumference) as shown in FIG. 1. The vertical synchronizing mark VM is detected by a vertical synchronizing mark detector, such as a photocoupler or the like, during a recording operation, and spindle servo control thus is performed so as to make the detection timing of the vertical synchronizing mark VM agree with a predetermined position on the time base of the composite video signal to be recorded. As a result, the irradiated position with a recording light beam, modulated in accordance with the composite video signal, is controlled to be a predetermined position in the circumferential direction of the disk at the detection timing of the vertical synchronizing-mark detector.

In such a system, phase control of the spindle motor is performed so as to make the spindle motor synchronous with an external composite video signal during a recording/erasing operation, while phase control of the spindle motor is performed so as to make the spindle motor synchronous with an external composite video signal or an external synchronizing signal in the case of external synchronizing drive, even during a reproducing operation. At that time, in the case where an external synchronizing source signal is not supplied for some reason or other, phase control of the spindle motor becomes unstable because there is no synchronizing source. Accordingly, there is a possibility of spindle motor runaway operation.

Further, in starting the system, phase control of the spindle motor cannot be started before the vertical synchronizing mark VM is detected normally. In the case where a disk having a different format is set erroneously, similarly to the above case, there is a possibility of spindle motor runaway operation.

SUMMARY OF THE INVENTION

Therefore, it is an object of the present invention to solve the aforementioned problems in the prior art.

It is another object of the present invention to provide a spindle control device in an optical disk recording/reproducing apparatus, in which a spindle motor can be prevented from runaway when no external synchronizing source signal is supplied for some reason or other in external synchronization operation, or when a disk having a different format is set erroneously.

In order to attain the foregoing and other objects, in a optical disk recording/reproducing apparatus in which one frame of a composite video signal is recorded on each track on an optical disk having a vertical synchronizing mark, and the recorded signal is reproduced or erased, a spindle control device according to the invention has a configuration such that, when the vertical synchronizing mark is detected and a synchronizing mark detection signal produced accordingly so that phase control on a spindle motor is performed in accordance with a phase difference of the synchronizing-mark detection signal relative to a time base reference signal, phase control is started under the conditions that the speed of the spindle motor is within a predetermined range and that the synchronizing mark detection signal is being detected normally.

In accordance with the inventive configuration, when the speed of the spindle motor is not within the predetermined range, or when the synchronizing mark detection signal is not being detected normally, phase control is not performed on the spindle motor in accordance with the phase difference of the synchronizing mark detection signal from the time base reference signal.

BRIEF DESCRIPTION OF THE DRAWINGS

Other features and advantages of the present invention will be apparent from the following description taken in connection with the accompanying drawings, wherein:

FIG. 1 is a plan view of an optical disk having a vertical synchronizing mark;

FIGS. 3(a) through 3(e) together comprise a timing chart for explaining the operation of phase control.

DETAILED DESCRIPTION OF THE PREFERRED EMBODIMENT

Figure 2:
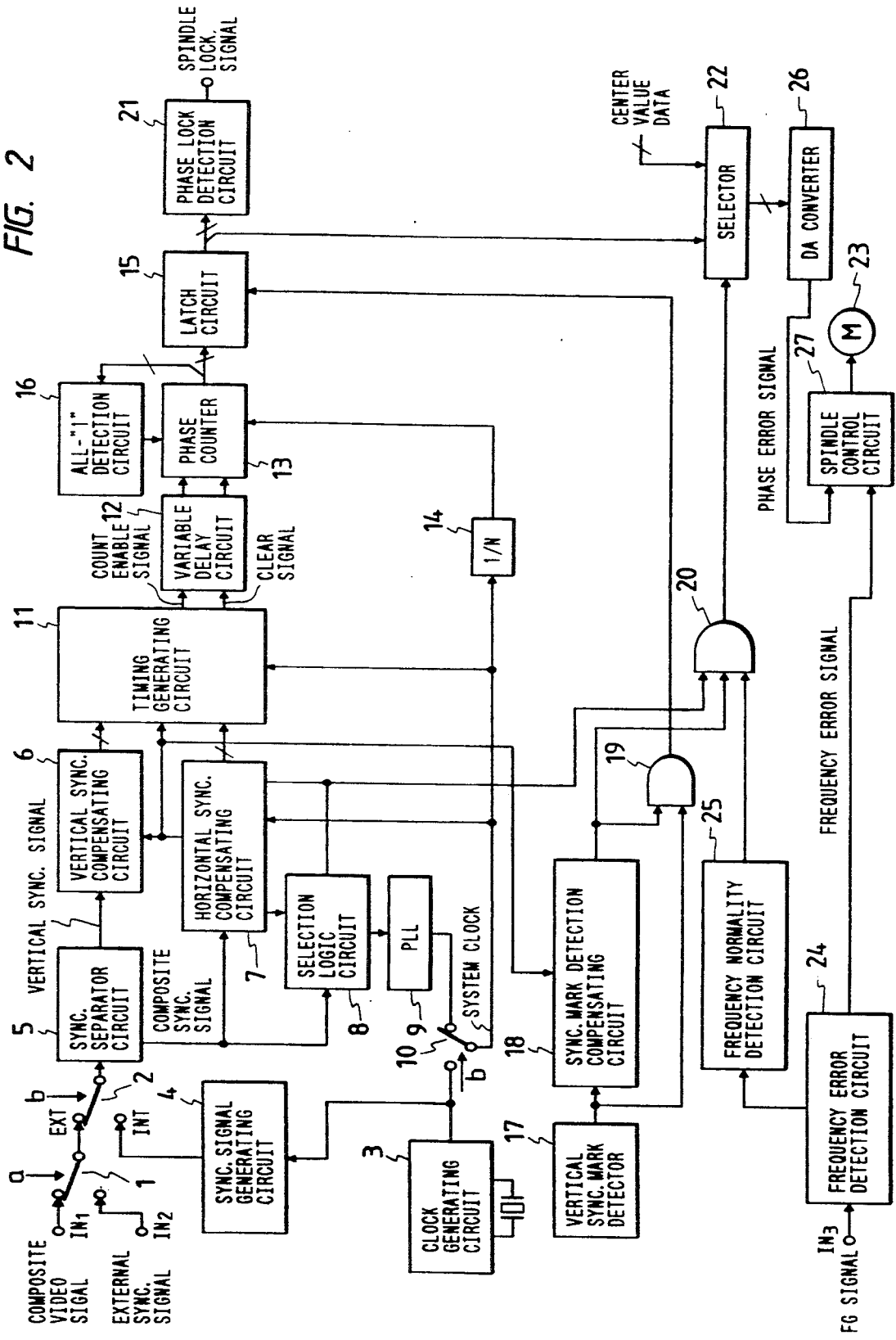
FIG. 2 is a block diagram showing an embodiment of the spindle control device of an optical disk recording/reproducing apparatus according to the invention.

Referring to the drawings, an embodiment of the spindle control device of the inventive optical disk recording/reproducing apparatus now will be described.

FIG. 2 is a block diagram showing an embodiment of the invention. In the drawing, a composite video signal to be recorded is supplied to an input terminal $IN_1$, and an external synchronizing signal is supplied to another input terminal $IN_2$. Those input signals then are supplied to the two inputs of a selector 1 so that the selector 1 selects one of the two input signals in accordance with a switching control signal a and supplies the selected signal to one of the two inputs of a selector 2. The selector 2 is supplied at its other input with a composite synchronizing signal generated as an internal synchronizing signal from a synchronizing signal generating circuit 4 on the basis of a master clock having a frequency of $4f_{sc}$ ($f_{sc}$ being a color subcarrier frequency) generated from a clock generating circuit 3. The selector 2 selects one of the input signals supplied thereto in accordance with a switching control signal b and outputs the selected signal. That is, the composite video signal is selected in recording the composite video signal, the external synchronizing signal is selected during external synchronization operation, and the internal synchronizing signal (the composite synchronizing signal) is selected during internal synchronization operation. The selected output signal of the selector 2 is supplied to a synchronizing separator circuit 5. A vertical synchronizing signal and the composite synchronizing signal are separated from each other in the synchronizing separator circuit 5, and are supplied to a vertical synchronization compensating circuit 6 and a horizontal synchronization compensating circuit 7, respectively.

The horizontal synchronization compensating circuit 7 recognizes existence of a synchronized condition and outputs a high-level horizontal synchronization OK signal when an inside counter of the horizontal synchronization compensating circuit 7 has detected the horizontal synchronizing signal contained in the composite synchronizing signal a number of times in succession. The horizontal synchronization compensating circuit 7 also produces a horizontal synchronizing clock which is in synchronism with the horizontal synchronizing signal and which has a frequency twice the frequency of the horizontal synchronizing signal on the basis of the count data of the inside counter. The composite synchronizing signal also is supplied to a selection logic circuit 8.

The horizontal synchronization OK signal and a timing gate signal which are produced by the horizontal synchronizing compensating signal 7 also are supplied to the selection logic circuit 8. The selection logic circuit 8 allows the composite synchronizing signal to pass as it is so that the composite synchronizing signal is supplied to a PLL circuit 9 when the horizontal synchronization OK signal is not being supplied to the selection logic circuit 8, that is, when there is no horizontal synchronization signal.

On the other hand, when the horizontal synchronization OK signal is being supplied to the selection logic circuit 8, that is, when there is a horizontal synchronization signal, the selection logic circuit 8 extracts only the horizontal synchronizing signal from the composite synchronizing signal on the basis of the timing gate signal, and supplies the extracted signal to the PLL circuit 9. The PLL circuit 9 produces a reproducing clock which has a frequency of $4f_{sc}$, and which is in synchronism with the horizontal synchronizing signal. The specific circuit configuration of the horizontal synchronizing compensating circuit 7, the selection logic circuit 8, and the PLL circuit 9 and the operations of the respective circuits are disclosed in detail in the specification of Japanese Patent Application No. 1-111343.

The master clock having a frequency of $4f_{sc}$ generated by the clock generating circuit 3, and the reproducing clock having a frequency of $4f_{sc}$ generated by the PLL circuit 9 are supplied to the two inputs of a selector 10. In accordance with a switching control signal b, the selector 10 selects the master clock supplied from the clock generating circuit 3 during internal-synchronization operation, and selects the reproducing clock supplied from the PLL circuit 9 during external-synchronization operation, and selects the reproducing clock supplied from the PLL circuit 9 during external-synchronization operation. As a result, the selector 10 supplies the selected clock as a system clock to the horizontal synchronization compensating circuit 7 and a timing generating circuit 11.

The count data of the inside counter of the vertical synchronizing compensating circuit 6, the horizontal synchronizing clock produced from the horizontal synchronization compensating circuit 7, the count data produced from a synchronization compensating counter, and the system clock are supplied to the timing generating circuit 11. The timing generating circuit 11 produces various kinds of timing signals, including a count enable signal and a clear signal to be supplied to a phase counter 13 which will be described later. After being delayed by a predetermined delay time by a variable delay circuit 12, the count enable signal and the clear signal are supplied to the phase counter 13. The phase counter 13 is enabled to perform counting only in a period in which the count enable signal is at a high level, and when the phase counter 13 is supplied with the clear signal, the count data thereof is cleared so as to be in the state of all-"0". A system clock is frequency-divided by N by a frequency divider 14.

The count data of the phase counter 13 is supplied to a latch circuit 15 and an all-"1" detection circuit 16. When the all-"1" detection circuit 16 detects that the count data of the phase counter 13 are in the state of all-"1", the all-"1" detection circuit 16 supplies a hold signal to the phase counter 13. Upon reception of the hold signal, the phase counter 13 stops its counting operation and holds count data in the state of all-"1" until the next clear signal is supplied thereto.

As shown in FIG. 1, a vertical synchronizing mark VM is provided on an optical disk every rotation of the disk. The vertical synchronizing mark VM is detected by a vertical synchronizing mark detector 17, such as a photocoupler or the like. A synchronizing mark detecting signal, a detection output of the vertical synchronizing mark detector 17, is supplied to a synchronizing-mark detection compensating circuit 18 and is supplied also to one input of a two-input AND gate 19.

Basically, the synchronizing mark detection compensating circuit 18 has the same structure as that of the horizontal synchronization compensating circuit 7. Upon detection of the synchronizing mark detection signal a number of times in succession at predetermined intervals, the synchronizing mark detection compensating circuit 18 produces a high-level synchronizing mark detection OK signal. On the other hand, upon detecting that the synchronizing mark detection signal has been omitted a number of times in succession from predetermined windows after production of the last synchronizing mark detection OK signal, the synchronizing mark detection compensating circuit 18 stops producing the synchronizing mark detection OK signal. The synchronizing mark detection OK signal is supplied to the other input of the AND gate 19 and also is supplied to one input of a three-input AND gate 20. The horizontal synchronizing OK signal produced from the horizontal synchronization compensating circuit 7 is supplied to another input of the AND gate 20.

When the synchronizing mark detection OK signal is produced from the synchronizing mark detection compensating circuit 18, the synchronizing mark detection OK signal is supplied as a latch signal to the latch circuit 15 through the AND gate 19. As a result, the count data of the phase counter 12 is latched upon detection of the vertical synchronizing mark. The latched data is supplied as phase data to a phase lock detection circuit 21 and a selector 22. If the phase data is within a predetermined range, the phase lock detection circuit 21 judges that phase lock has been completed and produces a spindle lock signal. Here, one horizontal synchronizing period is $$1H = f_{sc} \times 2/455_{sc}/910$$

the clock of the phase counter is $4f_{sc}/N$. Accordingly, the resolution of the phase control is expressed by $$\frac{N}{910} H.$$

A frequency generator (FG) for detecting motor speed is mounted on a spindle motor 23 for driving a disk to rotate. An FG signal produced from the frequency generator as speed information is supplied to a frequency error detection circuit 24 through an input terminal IN$_3$. The frequency error detection circuit 24 detects an error in the speed of the spindle motor 23 relative to a reference speed on the basis of the FG signal, and produces a frequency error signal representing the error. Further, a frequency normality detection circuit 25 judges whether the level of the frequency error signal is within a predetermined range. When the level of the frequency error signal is within the predetermined range, the frequency normality detection circuit 25 concludes that the frequency is normal and produces a frequency OK signal. The frequency OK signal is supplied to a third input of the three-input AND gate 20.

The AND gate 20 produces an output when all of the synchronizing mark detection OK signal, the horizontal synchronization OK signal, and the frequency OK signal are supplied to the AND gate 20. The output of the AND gate 20 is supplied to the selector 22 as a switching control input thereto. As a result, the selector 22 selects the phase data latched in the latch circuit 15 upon generation of the output of the AND gate 20, and supplies the selected data to a digital-to-analog (D/A) converter 26 in the following stage. When no output is produced from the AND gate 20, the selector 22 selects data corresponding to a center value of the D/A converter 26 and outputs the selected data.

The output of the D/A converter 26 is a phase error signal. That is, the phase error signal is output only under the condition that there is horizontal synchronization, the vertical synchronizing mark is detected normally, and the FG frequency is within the predetermined range. The frequency error signal and the phase error signal are supplied to a spindle control circuit 27 to perform phase control of the spindle motor 23.

Referring to a timing chart in FIGS. 3(a) through 3(e), the operation of the phase control now will be described.

One frame of a composite video signal is recorded every rotation of a disk, that is, in each track of the disk. The count enable signal shown in FIG. 3(a) is produced by the timing generating circuit 11 within a predetermined range in every frame. The count enable signal is delayed by the variable delay circuit 12 to become a delayed enable signal shown in FIG. 3(b). The delayed enable signal is supplied to the phase counter 13. The phase counter 13 is placed in the count-enabled state during the period in which the level of the delayed enable signal is high so as to perform its count operation.

On the other hand, a clear signal shown in FIG. 3(c) is produced by the timing generating circuit 11 at a position shifted by one field (½ frame) from the count enable signal shown in FIG. 3(a), the clear signal is delayed by the variable delay circuit 12, and the delayed clear signal shown in FIG. 3(d) is supplied to the phase counter 13. However, if the quantity of delay made by the variable delay circuit 12 is not so large, it is not always necessary to delay the clear signal. The count data of the phase counter 13 is cleared in accordance with the delayed clear signal shown in FIG. 3(d).

As a result, count data shown in FIG. 3(e) of the phase counter 13 indicated in the form of an analog mode is made to be in the state of all-"0" in accordance with the delayed clear signal shown in FIG. 3(d), progressively increases with clock frequency by the application of the delayed enable signal shown in FIG. 3(b), and reaches and maintains the state of all-"1" in a period from the point of time when the count data is made to be in the state of all-"1" to the point of time of application of the next delayed clear signal (FIG. 3(d)). That is, the count data has a form of a trapezoidal wave as shown in FIG. 3(e). The slant portion of the trapezoidal wave of the count data is used as a time base reference signal which is in synchronism with a composite video signal to be recorded and which is generated at a predetermined position on the time base. Accordingly, in the case where phase control is performed with this trapezoidal wave, phase pull-in is performed at the slant portion of the trapezoidal wave, and, as described above, the resolution of the phase control is expressed by $$\frac{N}{910} H$$

(where $1H \approx 63.5 \mu sec$).

Thus, when phase control of the spindle motor 23 is performed in accordance with the phase difference of the synchronizing mark detection signal from the time base reference signal, the phase control is started under the condition of existence of both the frequency OK signal, which is produced as a motor-speed detection signal when the speed of the spindle motor 23 is within a predetermined range, and the synchronizing mark detection OK signal, which is produced as a rotation synchronization detection signal when the synchronizing mark detection signal is detected normally. In contrast, when the above-mentioned condition is not satisfied, phase control is not performed. Accordingly, a runaway condition of the spindle motor 23 can be prevented, even in the case where an external synchronizing source signal is not supplied, because a cord of a synchronizing signal source is taken out during external synchronization operation, or the like, or in the case where a disk of a different format is placed by mistake.

Further, when phase control is started and there is a horizontal synchronization OK signal as a signal synchronization detection signal in an external synchronization detection system in addition to the above-mentioned condition, a runaway condition of the spindle motor 23 can be prevented more surely.

In the above-mentioned embodiment, phase control on the spindle motor 23 is performed by use of the data corresponding to a center value of the D/A converter 26 as phase difference information, in the case where both the frequency OK signal and the synchronizing mark detection OK signal are not present, or in the case where the horizontal synchronization OK signal, in addition to both the frequency OK signal and the synchronizing mark detection OK signal are not present. However, the system may be configured so that a protective operation, such as error indication or stopping of the spindle motor 23, may be performed when the above-mentioned condition is not satisfied for a predetermined period of time.

As described above, in the spindle control device according to the present invention in an optical disk recording/reproducing apparatus in which one frame of composite video signal is recorded on each track on an optical disk having a vertical synchronizing mark, and the recorded signal is reproduced or erased, when phase control on a spindle motor is performed in accordance with a phase difference of a synchronizing mark detection signal relative to a time base reference signal, the phase control on the spindle motor is started when both the frequency OK signal (motor speed detection signal), which is produced when the speed of the spindle motor is within a predetermined range, and the synchronizing mark detection OK signal, which is produced when the synchronizing mark detection signal (rotation synchronization detection signal) is detected normally, are present. Accordingly, when the above condition is not satisfied, phase control is not performed. Thus, the spindle motor can be prevented from a runaway condition even in the case where no external synchronizing source signal is supplied for some reason or other during external synchronization operation, or in the case where a disk having a different format is placed by mistake.

While the invention has been described in detail above with reference to a preferred embodiment, various modifications within the scope and spirit of the invention will be apparent to people of working skill in this technological field. Thus, the invention should be considered as limited only by the scope of the appended claims.

What is claimed is:

1. In an optical disk recording/reproducing apparatus in which one frame of a composite video signal is recorded on each track on an optical disk having a vertical synchronizing mark, and the recorded signal is reproduced or erased, a spindle control device comprising:

a spindle motor for driving said optical disk to rotate;

detection means for detecting said vertical synchronizing mark to generate a synchronizing mark detection signal;

means for producing a time base reference signal;

control means for performing phase control on said spindle motor in accordance with a phase difference of said synchronizing mark detection signal relative to said time base reference signal;

means, responsive to a speed of said spindle motor, for producing a motor speed detection signal when said speed of said spindle motor is within a predetermined range; and means for producing a rotation synchronization detection signal in accordance with a state of said synchronizing mark detection signal, said control means being responsive to respective states of both said motor speed detection signal and said rotation synchronization detection signal so as to begin said phase control.

2. A spindle control device according to claim 1, further comprising means for producing a signal synchronization detection signal in accordance with a state of detection of a synchronizing signal included in said composite video signal, said control means being responsive to said signal synchronization detection signal in addition to said motor speed detection signal and said rotation synchronization detection signal.

3. A spindle control device according to claim 1, said control means being responsive to reference phase difference information, when said motor speed detection signal and said rotation synchronization signal are not present, to perform said phase control.

4. A spindle control device according to claim 2, said control means being responsive to reference phase difference information, when said motor speed detection signal and said rotation synchronization signal are not present, to perform said phase control.

5. A spindle control device according to claim 1, further comprising protecting means for performing either an error display or a motor stoppage operation when said motor speed detection signal and said rotation synchronization are not present for a predetermined time.

6. A spindle control device according to claim 2, further comprising protecting means for performing either an error display or a motor stoppage operation when all of said motor speed detection signal, said rotation synchronization signal, and said signal synchronization detection signal are not present for a predetermined time.

* * * * *